United States Patent Office 3,350,924
Patented Nov. 7, 1967

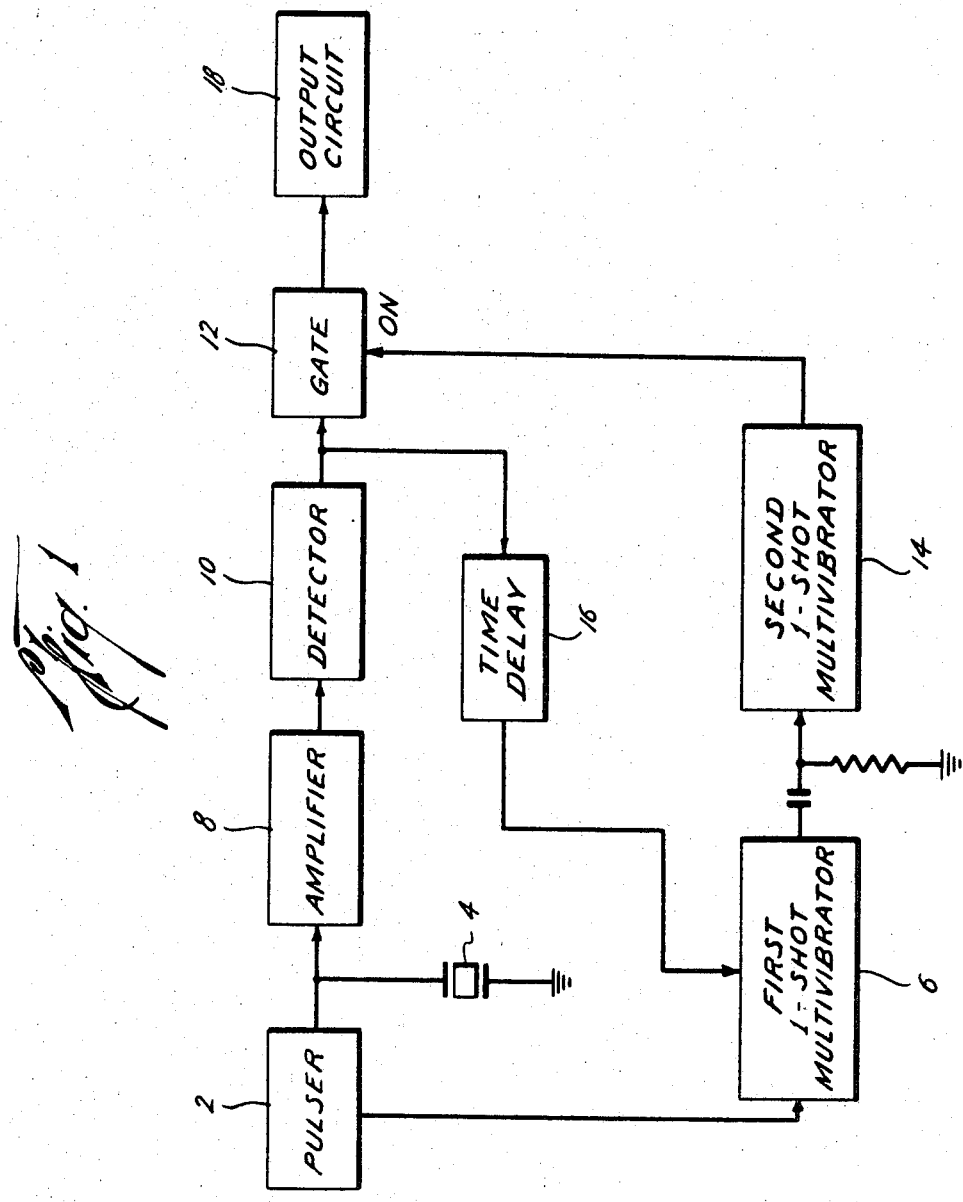

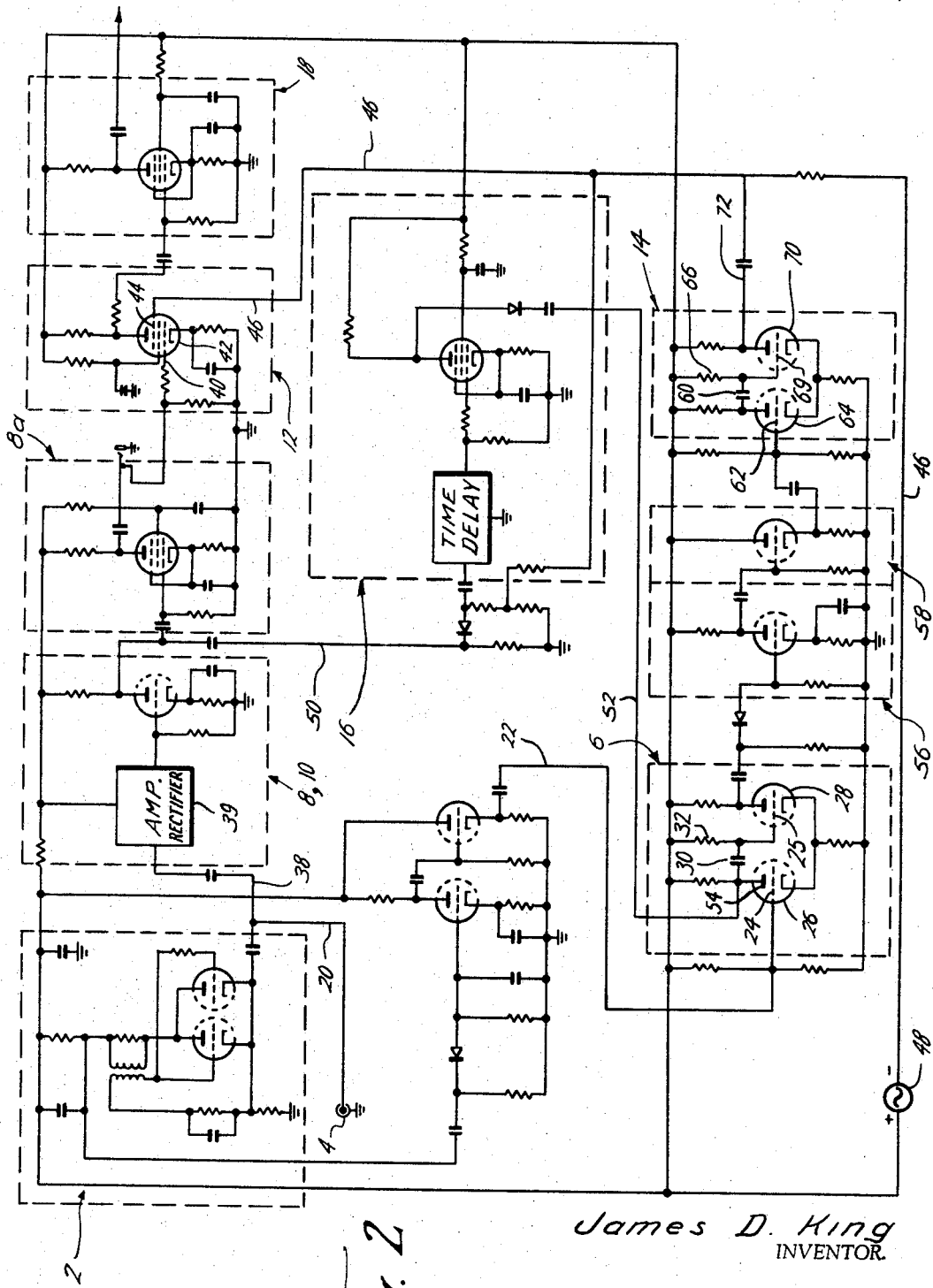

3,350,924
APPARATUS FOR ULTRASONIC INSPECTION
James D. King, San Antonio, Tex., assignor to Southwest Research Institute, San Antonio, Tex., a trust estate of Texas
Filed Sept. 26, 1966, Ser. No. 581,825
5 Claims. (Cl. 73—67.9)

ABSTRACT OF THE DISCLOSURE

Apparatus is disclosed for use with an ultrasonic inspection system to keep the initial pulse to the transducer and the first reflected signal, which are of considerably larger magnitude than the subsequent information bearing signals, from overloading the output circuit. The apparatus includes a pulser, first and second one-shot multivibrators, a gate, and a time delay circuit. The first multivibrator produces a switching signal for the second multivibrator in response to the first reflected signal from the front surface of the object. This signal is not obtained until after the end of the first reflected signal due to the delay means. The switching of the second multivibrator produces a signal to open the gate which thus passes only the desired signals, which follow the front surface reflection.

---

This invention is a continuation-in-part of the copending application of James D. King, Ser. No. 225,441, filed Sept. 24, 1962, now Patent No. 3,276,249 entitled, "Ultrasonic Measuring Apparatus."

This invention relates to ultrasonic inspection and is particularly directed to novel apparatus for accomplishing ultrasonic inspection whereby variations in the length of the acoustic coupling column between the transducer and the object being inspected will not affect the desired measurements.

In the art of ultrasonic inspection, periodic pulses of ultrasonic frequencies are applied to an article to be inspected by means of a suitable transducer which is coupled to the article by a liquid medium such as a column of water. These pulses are then reflected from the various surfaces (acoustic discontinuities) of the article and can be received by the original transducer or by other suitable means. By measuring the time intervals between transmission of a given pulse and reception of the successive reflected signals, information may be obtained concerning the thickness of the article and the presence and location of any flaws or defects which may exist within the article. Systems based upon this type of measurement can have application in industry, for example, in measuring the wall thickness of pipes and determining whether or not the pipe contains any hidden defects.

Heretofore, numerous systems have been proposed for accomplishing such measurements. However, none of these has been entirely satisfactory. In most of the prior art systems, the length of the liquid column coupling the transducer to the article has been extremely critical and any variation thereof will alter the travel time of the pulses and thus render the obtained measurements inaccurate or meaningless. Moreover, the magnitude of the original pulse and that of the first reflected signal are extremely large compared to the magnitude of the subsequent reflected signals, whereas it is these latter signals which actually yield the desired information.

Unfortunately, in many instances, it is physically difficult to accurately maintain constant the spacing between the transducer and the article being inspected. Thus, for example, in inspecting many articles, such as pipe, it is the general practice to generate a relative scanning movement between the piece to be inspected and the transducer and frequently this movement causes fluctuations in the transducer-to-article spacing. For example, when pipe is rotated so the transducer can scan the same, fluctuations in spacing may occur due to bumps in the pipe, it being out of round, etc. This can cause significant variations in the length of the coupling column which, as indicated above, results in inaccurate or meaningless measurements.

Furthermore, because the magnitudes of the information bearing signals are much smaller than the magnitudes of the transmitted pulse and the first reflected or top surface signal, it has been desirable to provide means to prevent the transmitted pulse and the first reflected signal from overloading the detection system and possibly paralyzing the circuitry or to prevent passage of the transmitted pulse and the first reflected signal to the detection system. Numerous types of systems have been proposed in the prior art for accomplishing these functions. However, many of the prior art systems have required highly complex circuitry while others have necessitated constant observation and frequent readjustment.

These disadvantages of prior art ultrasonic inspection systems are overcome with the present invention and an ultrasonic inspect system is provided whose functioning is independent of the variations in the length of the coupling column and which provides simple circuitry for preventing detection of the transmitted pulse and the first reflected signal. In adidtion, the system of the present invention is extremely rugged and stable and requires virtually no maintenance.

The advantages of the present invention are attained by providing novel apparatus for ultrasonic inspection employing a gated detection system having control means for opening and closing the gate for predetermined time intervals and actuating means which is armed by the transmitted or initial pulse and triggered by one of the reflected signals (usually the top surface echo) to operate said control means.

Accordingly, it is an object of the present invention to provide improved apparatus for ultrasonic inspection.

Another object of the present invention is to provide improved apparatus for ultrasonic inspection whose functioning is not adversely affected by variations in the length of the liquid column coupling the transducer to the article to be inspected.

A further object of the present invention is to provide improved apparatus for ultrasonic inspection which prevents detection of the transmitted pulse and at least one of the reflected signals while permitting detection of subsequent reflected signals occurring during a predetermined time interval after the occurrence of the unwanted reflected signals.

A specific object of the present invention is to provide novel apparatus for ultrasonic inspection employing a gated detection system having control means for opening and closing the gate for predetermined time intervals and actuating means which is armed by the transmitted pulse and triggered by the first reflected signal to operate said control means.

These and other objects and features of the present invention will be apparent from the following detailed description thereof taken with reference to the figures of the accompanying drawings in which:

FIG. 1 is a block diagram of an ultrasonic inspection system embodying the present invention; and FIG. 2 is a circuit diagram of the ultrasonic inspection system of FIG. 1.

In one type of ultrasonic inspection of an article, periodic pulses of energy are applied to the article by means of a suitable transducer which is coupled to the article by a suitable coupling medium such as that provided by immersing the transducer and article in a liquid medium or by providing a column of liquid, either contained or flowing, between the transducer and article.

Much of the energy of the applied pulse is reflected at the first or "entrant" surface of the article. However, some of the pulse energy passes into the article and undergoes repeated reflections between the front and rear surfaces of the article with some additional energy being lost as a result of each such reflection. Some of the energy lost during each reflective escapes from the article and can be sensed and converted into electrical pulses by the original transducer. By measuring the time between certain of the pulses, it is possible to determine the thickness of the article with precision. Furthermore, it has been found that a flaw or defect occurring within the article can cause a reflected signal which can be distinguished from the signals reflected from the respective surfaces of the article. Thus, it is possible by ultrasonic inspection to determine the presence and location of such flaws or defects.

As indicated above, most of the energy of the transmitted pulse is reflected at the entrant surface of the article and hence becomes the first reflected signal while the balance of the energy of the emitted pulse penetrates the article and is dissipated gradually by the losses corresponding to successive reflections from the front and rear surfaces within the article or from flaws or defects within the article. In view of this, the magnitudes of the emitted pulse and the first reflected signal will be much larger than the magnitudes of the subsequent reflected signals. In fact, the emitted pulse and the first reflected signal are so much larger than the subsequent signals that electronic circuit components which are capable of accommodating signals of the magnitude of the emitted pulse and the first reflected signal are frequently insensitive to signals of the magnitude of the latter signals, whereas circuit components which are sensitive to signals of the magnitude of the latter signals may be overloaded by signals having magnitudes as great as the emitted pulse or the first reflected pulse.

To overcome these problems, the circuit shown in block diagram in FIG. 1 may be employed. As seen therein, a pulser 2 provides electronic pulses at suitable frequencies to the transducer 4 which converts the electronic pulse to an ultrasonic pulse and applies it by means of a suitable coupling column to the article to be inspected. The coupling column may be conventional and therefore is not shown. Simultaneous with this, the pulser 2 applies an electronic pulse to a first one-shot multivibrator 6 having a stable condition and an unstable condition. As is more fully explained below, this pulse drives the multivibrator 6 to its unstable condition in which it remains for a predetermined time interval. The pulse which is applied to the transducer 4 also passes through amplifier circuit 8 and rectifier or detector circuit 10 to gate circuit 12. Gate 12 is normally maintained closed and allows signals to pass only during a predetermined time interval under the control of a second one-shot multivibrator 14, as hereinafter explained. Since gate 12 is closed, the pulse from pulser 2 cannot pass to the output circuit but it is applied through time delay circuit 16 to the first one-shot multivibrator 6 but does not alter the condition of multivibrator 6.

The transducer 4 serves, in the circuit of FIG. 1, as both the transmitter and receiver. Thus, when the transmitted pulse is reflected from the various surfaces of the article under inspection, the reflected signals will travel up the coupling column and will be converted by transducer 4 into electrical pulses. When the first reflected signal from the entrant surface of the article is converted by transducer 4, a large electronic pulse will be passed through amplifier 8 and detector 10 to gate 12. However, gate 12 is still closed. Therefore, the pulse passes through time delay circuit 16 to the first multivibrator 6. This pulse serves to return multivibrator 6 to its stable condition and causes it to send a signal to the second multivibrator 14 which renders multivibrator 14 temporarily unstable. This opens gate 12 for a predetermined time interval during which the pulses of the first echo train will be passed through gate 12 to the output circuit, represented by block 18. The output circuit 18 may be any conventional circuit for utilizing the signals from transducer 4 and, consequently, is not shown in detail. Since the signals of the second and subsequent echo trains are generally too small to be useful, but may be large enough to be detrimental, the second multivibrator 14 is preferably conditioned to hold gate 12 for a time interval which is approximately equal to the time width of the first echo train less the first or entrant surface echo signal.

From the foregoing description, it will be seen that the emitted pulse and the first reflected signal will be blocked from the output circuit 18 by gate 12. At the same time, the initial pulse serves to arm the multivibrator 6 which actuates gate control multivibrator 14. Subsequently, the entrant surface echo triggers multivibrator 6 to actuate multivibrator 14 which opens gate 12 for passage of the remaining pulses of the first echo train. With this method of operation, it will be seen that variations in the length of the coupling column will not affect the operation of the system since, regardless of the length of the column, gate 12 will not be opened until arrival of the entrant surface signal. Thus, the circuit of FIG. 1 makes it possible to prevent the emitted pulse and the entrant signal pulse from passing to the output circuit and simultaneously makes the operation of the system independent of variations in the length of the coupling column.

FIG. 2 is a more detailed diagram of the circuit of FIG. 1 and the operation and advantages of the present invention may be more readily understood therefrom. Those portions of the circuit of FIG. 2 which correspond to the elements of FIG. 1 are enclosed with dotted lines and identified generally by the reference numerals employed in FIG. 1. Thus, pulser 2, shown as a free running blocking oscillator, supplies the initial pulse to transducer 4 by means of conductor 20 and simultaneously applies a strong positive pulse via an amplifier and cathode follower and conductor 22 to the input grid 24 of tube 26 of first one-shot multivibrator 6. Tube 26 of multivibrator 6 is normally nonconductive while tube 28 of multivibrator 6 is normally conductive. When the positive pulse from pulser 2 is applied to the grid of tube 26, tube 26 begins to fire and tube 28 is driven to cut-off. The negative charge on grid 25 decays exponentially with a time constant which is determined by the values of capacitor 30 and resistor 32 in the circuit of grid 25. This time constant is preferably chosen such that tube 28 will, unless otherwise triggered, be held in the cut-off condition for a time interval which is longer than the normal time between transmission of the initial pulse and generation of the first reflected signal by transducer 4 but which is smaller than the time between successive pulses from the pulser 2. In this way, tube 28 will be maintained nonconductive until after the entrant surface echo has been received by transducer 4. However in the event that the entrant surface echo is not detected, due to loss of signal coupling or other mishaps, the tube 28 will be allowed to become conductive again, due to decay of its negative grid potential prior to emission of a subsequent pulse by the pulser 2 and hence will be ready to operate normally when the successive pulse is received.

The pulse applied by pulser 2 to transducer 4 over conductor 20 also passes via conductor 38 to amplifier and rectifier 39 and the other stage of amplification shown in block 8, 10. The rectified and amplified pulse is then applied to amplifier 8a and then to control grid 40 of pentode 42 of the gate circuit 12. However, the suppressor grid 44 of pentode 42 is normally maintained at a cut-off negative potential by means of conductor 46 from a suitable power source, indicated generally at 48. Consequently, pentode 42 is normally maintained nonconductive and gate circuit 12 will not pass the pulse from pulser 2 to the output circuit, indicated by block 18.

The pulse from pulser 2 blocked by gate 12 is passed via conductor 50, time delay circuit 16 and conductor 52 to the plate 54 of tube 26 of multivibrator 6. Time delay circuit 16 delays signals passing therethrough for a time interval which is equal to or slightly greater than the width of the electronic pulse emitted by transducer 4 upon receipt of the entrant surface echo. This is significantly less than the time constant of the RC circuit comprising capacitor 30 and resistor 32. Thus, the pulse from pulser 2 is applied to the plate 54 of the tube 26 while tube 28 is being held nonconductive due to the strong negative potential applied to its grid 25 by the pulse from pulser 2 and is insufficient to overcome the effect of this grid potential. Consequently, tube 28 of multivibrator 6 remains nonconductive.

As discussed above, most of the energy of the initial pulse is reflected at the entrant surface of the article under inspection and is contained in the first reflected signal sensed by transducer 4. This signal is converted by the transducer into an electronic signal which is applied via conductor 38 to amplifier 8, rectifier 10, amplifier 8a and the control grid 40 of pentode 42. However, the suppressor grid 44 of pentode 42 is still negatively biased. Consequently, gate circuit 12 is still nonconductive. Accordingly, the first reflected signal is passed through time delay circuit 16 to plate 54 of tube 26 of multivibrator 6. During the time between the emission of the initial pulse by pulser 2 and receipt of the first reflected signal at plate 54 of tube 26, the negative charge impressed on the control grid 25 of tube 28 has been decaying. Thus, when the first reflected signal is applied to plate 54 of tube 26, this is sufficient to overcome the remaining negative charge on grid 25 and to return tube 28 to a conductive state. In the event that the first reflected signal is not detected, due to loss of signal coupling or the like, the negative charge on grid 25 will continue to decay, as noted above, until the potential is low enough to permit tube 28 to conduct. This insures that the system will be ready to operate normally when a subsequent pulse is received from pulser 2.

When tube 28 returns to a conductive state it generates a pulse which is amplified by a suitable amplifier 56 and causes cathode follower 58 to apply a positive signal to control grid 62 of normally nonconductive tube 64 of the second multivibrator 14. This causes normally nonconductive tube 64 to be rendered conductive for a time interval determined by the values of capacitor 60 and resistor 66. Preferably, this time interval is chosen to be approximately equal to the time width of the first echo train less the entrant surface echo. When tube 70 is extinguished, its plate increases in potential and applies a positive signal over conductors 72 and 46 to the suppressor grid 44 of pentode 42 in gate circuit 12. This permits pentode 42 to conduct and serves to open gate circuit 12 to allow passage of the signals of the first echo train. When the negative charge of grid 69 of tube 70 has decayed, tube 70 again becomes conductive and tube 64 is extinguished. As a result, pentode 42 is extinguished and gate 12 is again closed to block passage of any signals which might be detected corresponding to the second or subsequent echo trains.

It will be apparent from the foregoing that when the entrant surface signal is to be blocked from the output, the delay of the time delay circuit 16 is made long enough so that the application of this signal to the gate circuit ceases before the delayed signal causes the multivibrators to open the gate circuit. Normally, the delay can be equal to the time width of this signal. However, the delay should not be so great that the gate circuit is held closed while the desired intelligence signals are applied thereto.

Also, the first one-shot multivibrator circuit 6 and the initial pulse from pulser 2 should be such that the resulting bias on the multivibrator will be greater than the amplitude of the initial pulse applied through the time delay so that the latter signal cannot cause the multivibrator to revert to its normal state. However, the rate of decay of such bias should be great enough that the entrant surface signal applied through the delay line can cause the multivibrator to revert to its normal state.

It will be apparent that the values of the various time delays described herein may be varied by varying the values of the components determining the respective time delays. Moreover, numerous other variations and modifications may obviously be made without departing from the invention. Accordingly, it should be clearly understood that the form of the invention described above and shown in the accompanying drawings is illustrative only and is not intended to limit the scope of the invention.

The invention having been described, what is claimed is:

1. Apparatus for ultrasonic inspection comprising a pulser for emitting ringing pulses; transducer means connected to the pulser to be driven by said ringing pulses for generating acoustic pulses to be applied to an article being inspected through a liquid column and for detecting the top surface echo and succeeding echo pulses reflected from said article through such liquid column and generating corresponding electrical signals; an output circuit for utilizing signals from said transducer means; gate means connected between said transducer means and said output circuit so as to receive all electrical signals generated by said transducer means and being normally in a closed position but adapted to be changed to an open position to pass signals to said output circuit upon receipt of an appropriate control signal; gate control means for generating said appropriate control signal and having a biasing means capable of applying a bias that will prevent the gate control means from generating the appropriate control signal when the bias is greater than a predetermined magnitude; means connecting the pulser to the gate control means so as to cause the biasing means to apply said bias responsive to receipt of a ringing pulse; means including a time delay means connecting the input to said gate means and also to the gate control means to conduct signals applied from the pulser and the transducer to the gate means also to the biasing means to reduce the bias applied thereby; said biasing means upon receipt of a ringing pulse from the pulser applying a bias sufficiently great that when the ringing pulse signal from the pulser is applied via the time delay means to the biasing means the bias is not reduced to below said predetermined magnitude so as to cause an appropriate control signal to be generated but said biasing means thereafter reducing the bias sufficiently for a predetermined succeeding echo signal, when applied to the biasing means via the time delay means, to reduce the bias on said gate control means below said predetermined magnitude so as to cause an appropriate control signal to be generated by said gate control means to permit succeeding echo signals to pass through said gate means.

2. The apparatus of claim 1 wherein said time delay means has a time delay substantially equal to the time base of said top surface echo signal whereby the gate means will not be opened until the top surface echo signal has been removed therefrom.

3. Apparatus for ultrasonic inspection comprising a pulser for emitting ringing pulses, transducer means driven by said ringing pulses from said pulser for applying acoustic pulses to an article to be inspected through a liquid column and for detecting pulses reflected from said article through such liquid column, an output circuit for utilizing signals from said transducer means, gate means connected between said transducer means and said output circuit and being normally in a closed position but adapted to be changed to an open position to pass signals to said output circuit upon receipt of an opening signal, gate control means for generating said opening signal and conducting said opening signal to the gate means including a one-shot multivibrator connected to said gate means and capable of triggering said opening signal during its transition from its unstable to its stable state, said multivibrator also being connected to said pulser to be switched from its stable to its unstable state upon the pulser emitting a ringing pulse, time delay means for conducting signals applied to said gate input also to said multivibrator to switch the latter from its unstable to its stable state, said multivibrator being biased sufficiently to remain in its unstable state for a minimum predetermined time period after switching thereto regardless of signals applied to the multivibrator through the time delay means but said bias decaying sufficiently with time that when the transducer means detects an entrant surface signal which is then applied to the multivibrator via the time delay means, the multivibrator will be switched to its stable state to open the gate.

4. The apparatus of claim 3 wherein said gate control means includes means for terminating said opening signal to close the gate a predetermined time after it is opened.

5. Apparatus for ultrasonic inspection comprising a source of pulses, transducer means connected to said source and for applying acoustic pulses to an article to be inspected through a liquid column and for detecting pulses reflected from said article through such liquid column, an output circuit for utilizing pulses detected by said transducer means, gate means connected between said transducer means and said output circuit, said gate means having an open position for passing signals from said transducer means to said output circuit and a closed position for blocking passage of signals from said transducer means to said output circuit, a one-shot multivibrator having a stable position and an unstable position and capable of emitting a control pulse during transition from said unstable position to said stable position, said multivibrator including means responsive to a pulse from said source of pulses for switching said multivibrator from said stable position to said unstable position and for maintaining said multivibrator in said unstable position for a first predetermined time interval, means responsive to the entrant surface signal for switching said multivibrator from said unstable position to said stable position following receipt of the entrant surface signal, and means responsive to said control pulse for opening said gate means for a predetermined time interval.

References Cited

UNITED STATES PATENTS

| | | | |
|---|---|---|---|
| 2,682,766 | 7/1954 | Van Valkenburg | 73—67.9 |
| 2,883,860 | 4/1959 | Henry | 73—67.9 |
| 3,009,353 | 10/1961 | Erdman | 73—67.9 |
| 3,114,258 | 12/1963 | Stebbins et al. | 73—67.9 |

FOREIGN PATENTS 559 759    4/1960    Belgium.

JAMES J. GILL, *Acting Primary Examiner.*

J. P. BEAUCHAMP, *Assistant Examiner.*